United States Patent [19]

Sheem

[11] Patent Number: 5,550,942

[45] Date of Patent: Aug. 27, 1996

[54] MICROMACHINED HOLES FOR OPTICAL FIBER CONNECTION

[76] Inventor: Sang K. Sheem, P.O. Box 2141, Livermore, Calif. 94551

[21] Appl. No.: 397,941

[22] Filed: Mar. 3, 1995

Related U.S. Application Data

[62] Division of Ser. No. 276,829, Jul. 18, 1994, abandoned.

[51] Int. Cl.⁶ .................. G02B 6/00; G02B 6/36
[52] U.S. Cl. ........................................ 385/53
[58] Field of Search ....................... 385/53, 54, 55, 385/56, 64, 65, 70, 76, 83

[56] References Cited

U.S. PATENT DOCUMENTS

| | | | |
|---|---|---|---|
| 4,341,439 | 6/1982 | Hodge | 350/96.22 |
| 4,725,114 | 2/1988 | Murphy | 359/96.17 |
| 4,818,058 | 4/1989 | Bonanni | 385/53 |
| 4,830,456 | 5/1989 | Kakii et al. | 385/53 |
| 5,188,539 | 2/1993 | Langdon | 439/341 |
| 5,259,050 | 11/1993 | Yamakawa et al. | 385/59 |
| 5,315,678 | 5/1994 | Maekawa et al. | 385/59 |

*Primary Examiner*—Akm E. Ullah

[57] ABSTRACT

Novel embodiments and manufacturing methods for optical fiber connector plugs and sleeves are disclosed, in which precision holes are fabricated through a thin slab, preferably using preferential etching technique on a semiconductor wafer, such as silicon or gallium arsenide. The angle of the slope is specific in the preferentially etched through-holes. Optical fibers are inserted into the V-shaped through-holes, with the orientation perpendicular to the surface of the slab. The edges of the slab may be sloped at the same slope angle of the through-holes. The same technique can be used to fabricate a sleeve with a twin V-square recess with the same slope angle on the both ends. Since the slope angles are all same and specific, precisely-fitting through-holes, plugs, and sleeves may be fabricated for single-fiber connection and array connection.

21 Claims, 18 Drawing Sheets

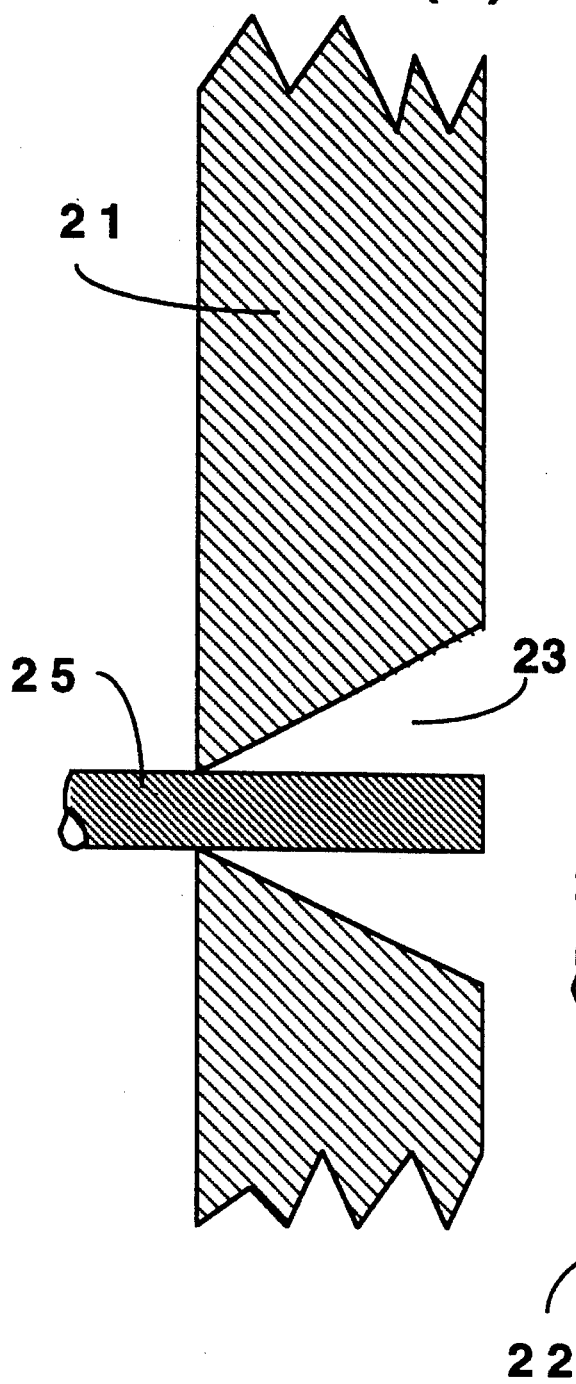
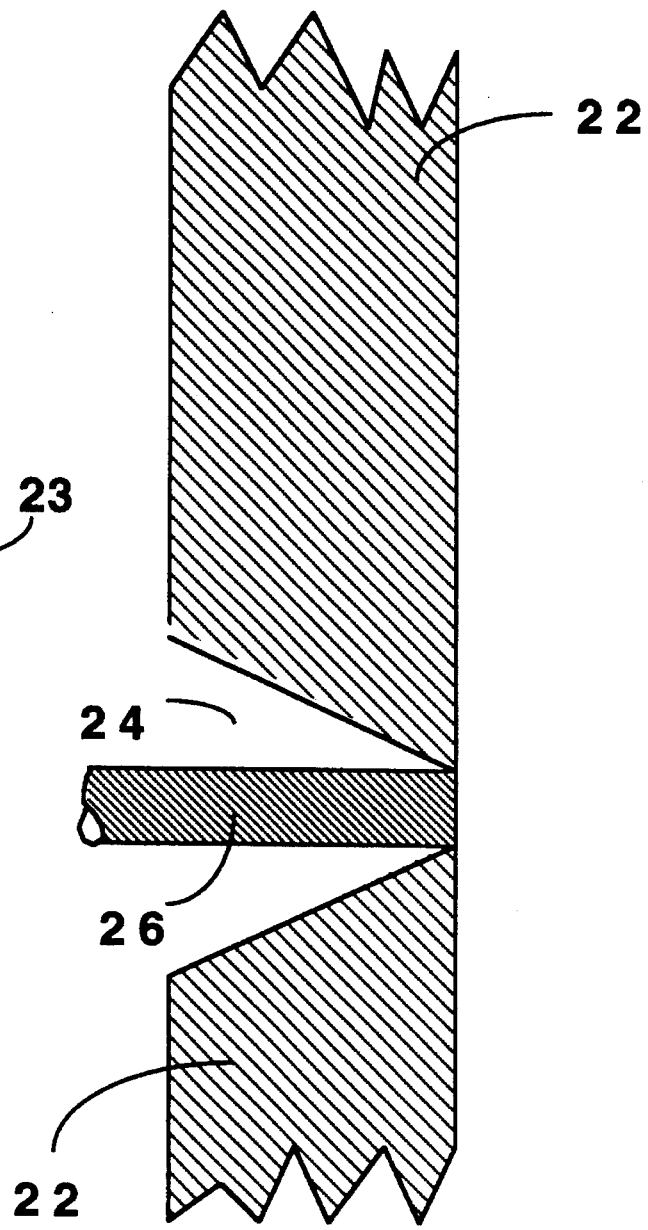

FIG. 10
FIG. 11
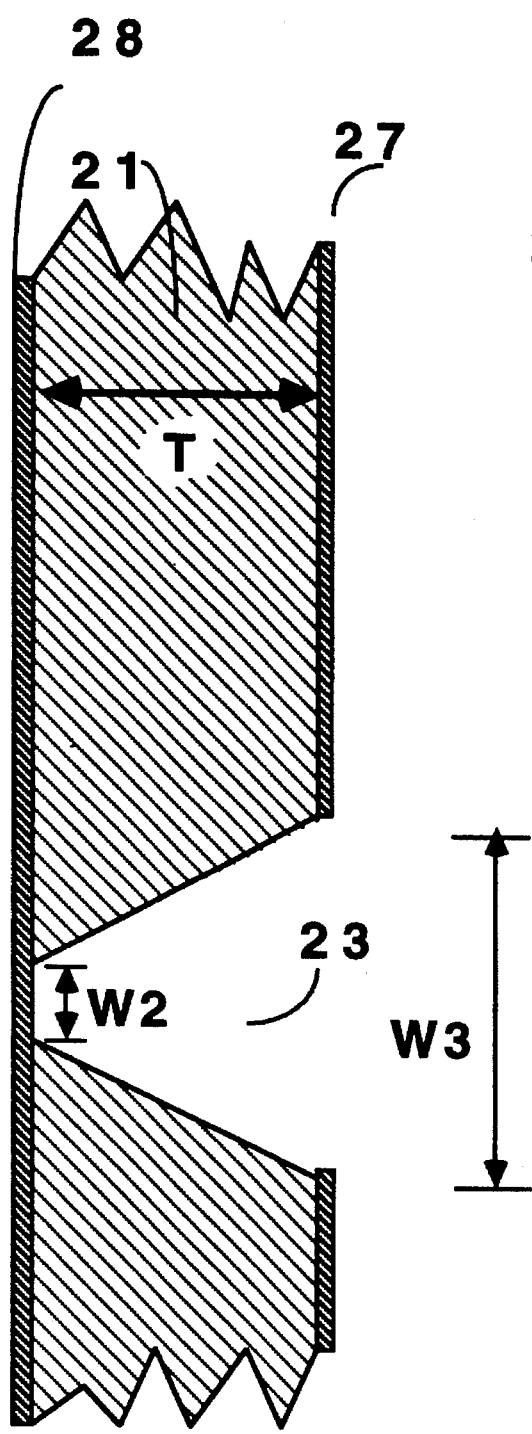
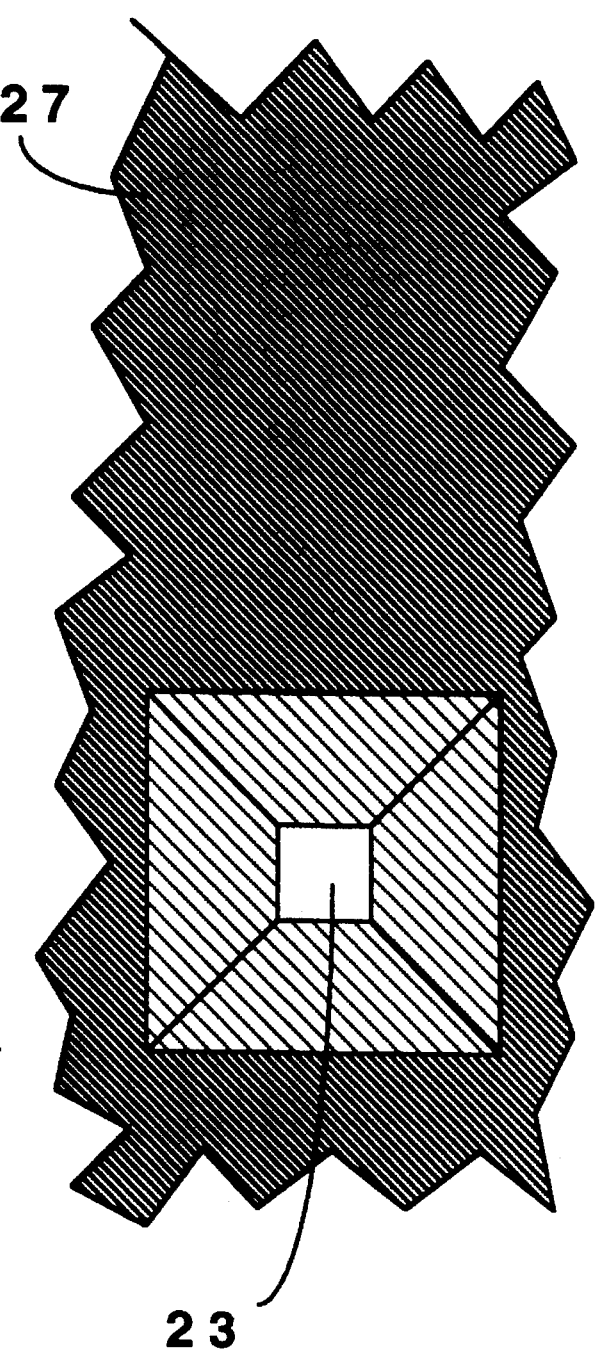

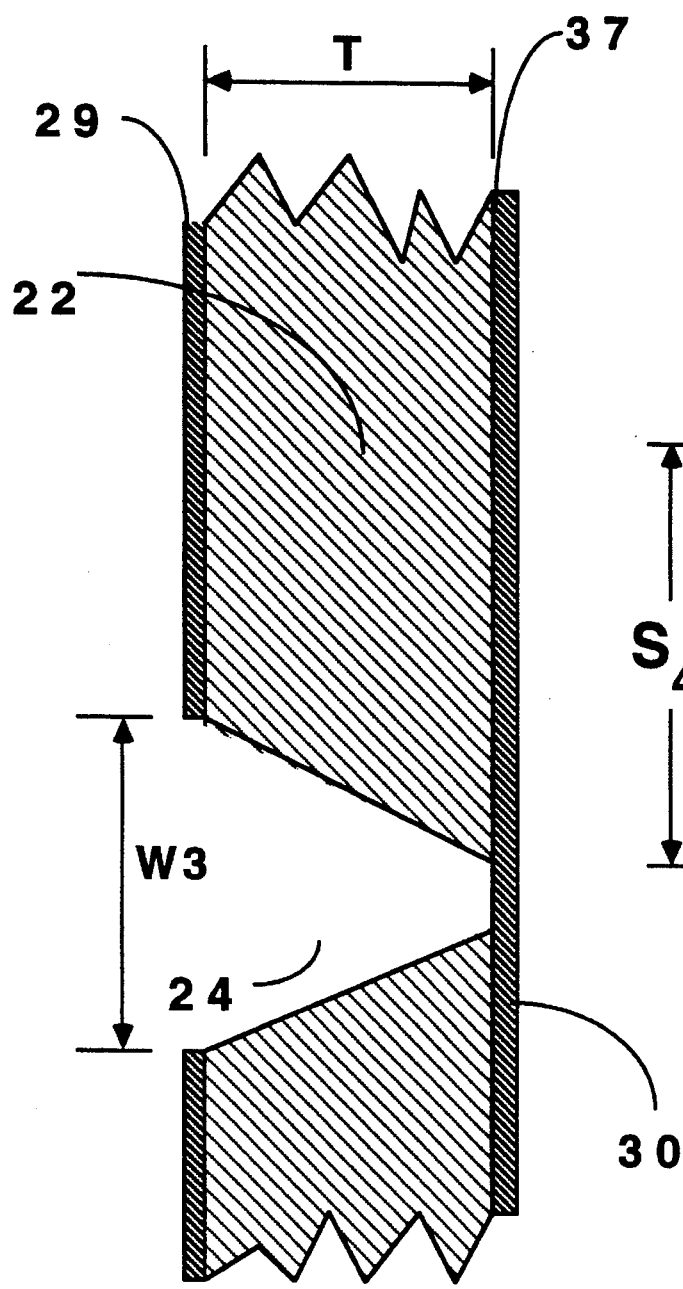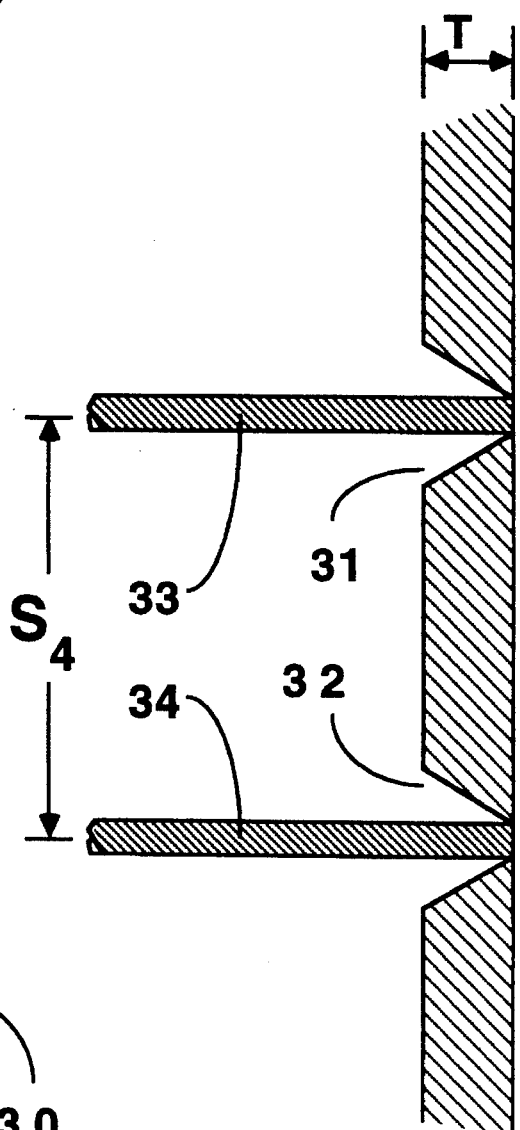

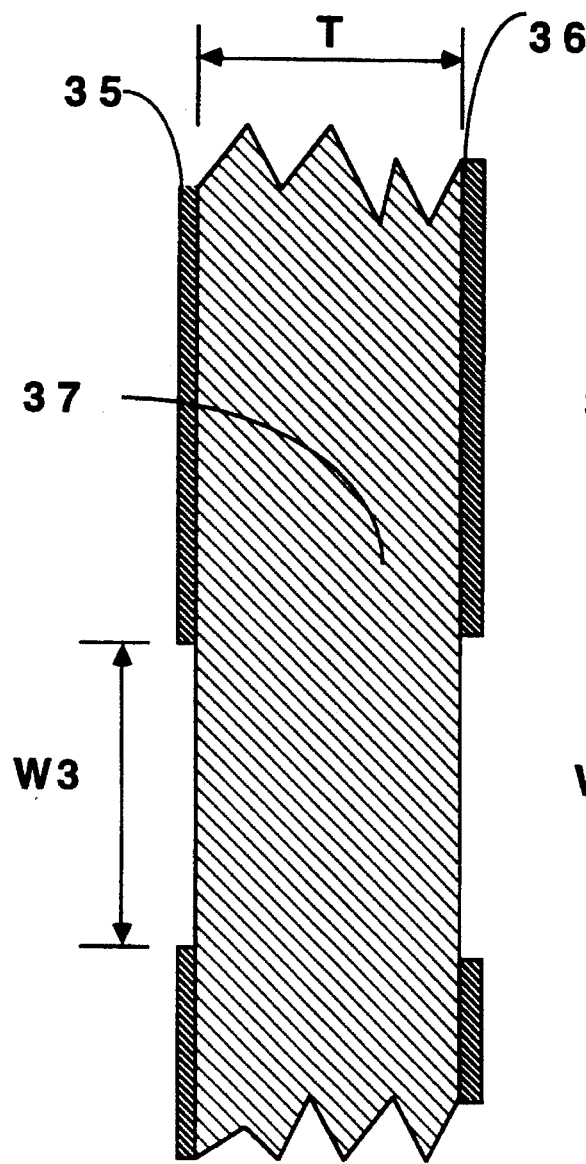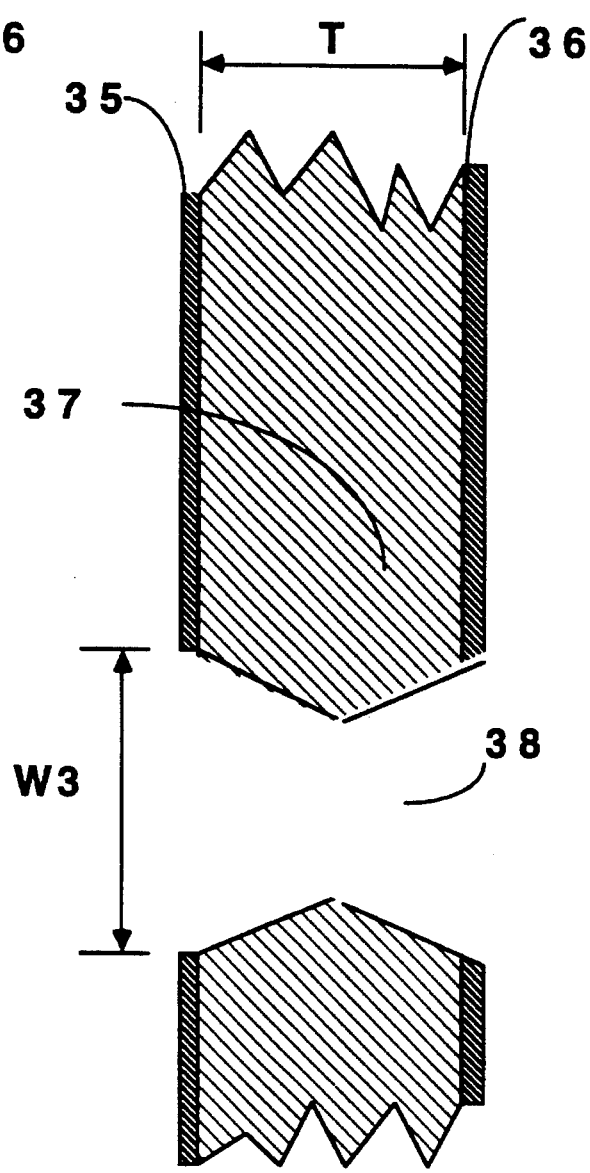

MICROMACHINED HOLES FOR OPTICAL FIBER CONNECTION

SPECIFICATION

This is a division of a parent application, Ser. No. 08/276,829, filing date Jul. 18, 1994, now abandoned, titled "FACE-LOCK INTERCONNECTION MEANS FOR OPTICAL FIBERS AND OTHER OPTICAL COMPONENTS, AND MANUFACTURING METHODS OF THE SAME". Most of the novel embodiments disclosed in the present application are described in the referred parent application to enhance the understanding of the claimed novel embodiments of the parent application. But as noted in the parent application, the embodiments disclosed and claimed in the present application are not claimed in the parent application.

BACKGROUND OF THE INVENTION

Optical fibers have been used widely for many applications, most notably for optical fiber communication. As the optical fiber communication is inching toward individual offices and residential area, the cost of optical fiber interconnection becomes the major issue. The optical fiber interconnection includes fiber-to-fiber connection, fiber-to-light source connection, fiber-to-detector connection, and an optical fiber to other optical components. The interconnection costs are high due to the small size of the optical beams involved. A typical laser diode has a light-emitting spot in the order of one or two microns. Single-mode fiber, the most commonly used one, has about 9-micron core (and 125 micron cladding). When two single-mode fibers, or a single-mode fiber and a laser diode, are connected, the alignment should be within one or two micron in terms of the transverse offset.

In an conventional connector, in order to achieve such an alignment accuracy when connecting two optical fibers, each of the fibers is inserted in an elongated precision plug with nominally 125 micron inside diameter (ID). The two mating plugs are then inserted into an elongated precision sleeve. The required tight dimensional requirements of these elongated parts drive up the cost of the optical fiber connection.

The difficulty escalates quickly when the number of optical fibers increases in so-called array interconnection. Surface emitting laser diodes and detectors are produced in a two-dimensional array on a semiconductor wafer. The positional accuracy of these optical components while on the wafers is better than one micron as they are registered by photolithographic method. However, such a precision has not been achieved in the conventional array connectors for optical fibers, while there are increasing requirement for a large array interconnection for local area network, optical data processing, and optical computing.

SUMMARY OF THE PRESENT INVENTION

Accordingly, it is the primary objective of the present invention to devise an alternative approach for connecting optical fibers to another optical fibers, light sources, detectors, lenses, and other optical components.

It is the ultimate objective of the present invention to lower the costs of optical interconnections involving optical fibers, integrated optic waveguides, light sources, detectors, lenses, and other related optical components, so as to maximize the contribution of the fiber optics to the construction of information superhighway infrastructure.

In the present invention, a through-hole is fabricated in a thin slab, and the optical fiber is inserted into the hole to be terminated on the front mating surface of the thin slab. The optical fiber is oriented largely perpendicular to the thin slab. The hole position may be registered on the thin slab by a conventional photolithographic procedure, which have sub-micron registration accuracy, and then the hole is fabricated by micromachining technique. Such a fabrication technique can produce holes with limited depth because the micromachining techniques are basically surface technology. A proper supporting body may be added to the rear side of the thin slab so as to maintain the fiber in place and in the perpendicular orientation. Semiconductor wafers made of silicon, gallium arsenide, and indium phosphite are especially suitable materials as the thin slab because their unique preferential etching characteristics result in sharply defined precision V-square holes with a tapered entrance for easy insertion of optical fiber. The both plugs and sleeves may be fabricated using such a technique.

BRIEF DESCRIPTION OF THE DRAWINGS

FIG. 8 shows two wafers fabricated by a micromachining technique utilizing an anisotropic preferential etching method; with optical fibers terminated in different ways.

FIG. 10 shows the same as in FIG. 9, except that the wafer has been preferentially etched from the front side to make a V-square hole.

FIG. 11 shows the surface view of FIG. 10.

FIG. 12 shows a wafer that has been preferentially etched from the rear side so as to orient the V-square hole opposite from that of FIG. 10.

FIG. 13 shows an extension of the embodiment of FIG. 12 into an array form.

FIG. 14 shows a wafer on which two identical openings are provided on the mask layers on the both sides.

FIG. 15 shows the wafer of FIG. 14 after it has been preferentially etched from the both sides to result in a twin V-square hole, thus forming a connector sleeve.

DETAILED DESCRIPTION

Figure 1:
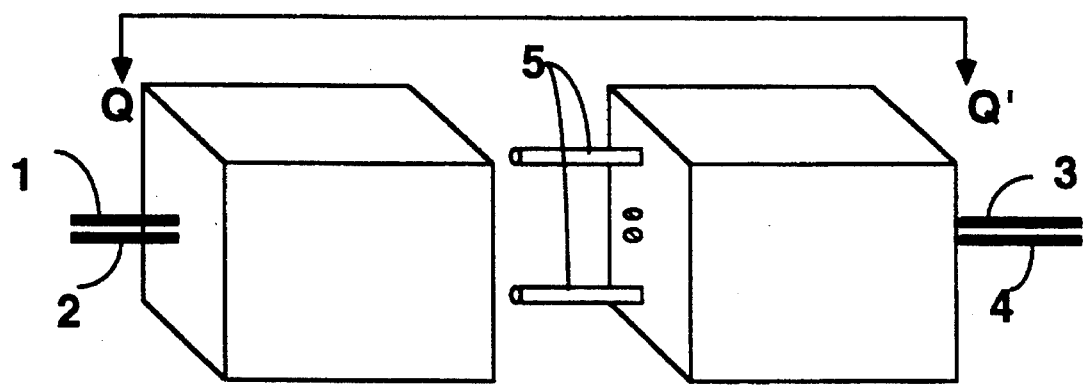
FIG. 1 shows schematically a conventional connector embodiment for aligning optical fibers, especially in an array form, using pins and holes.
Figure 2:
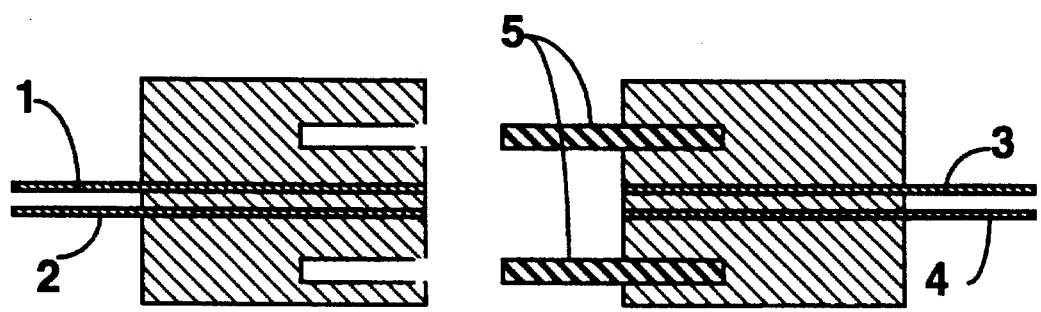
FIG. 2 shows a sectional side view of the connector embodiment of FIG. 1.

FIG. 1 shows one conventional way of connecting an array of optical fibers 1 and 2 to another array with fibers 3 and 4 using a set of elongated alignment pins 5. FIG. 2 shows the sectional side view along Q—Q'. An example of this prior art can be found in U.S. Pat. No. 4,341,439 (Malcom H. Hodge).

Figure 3:
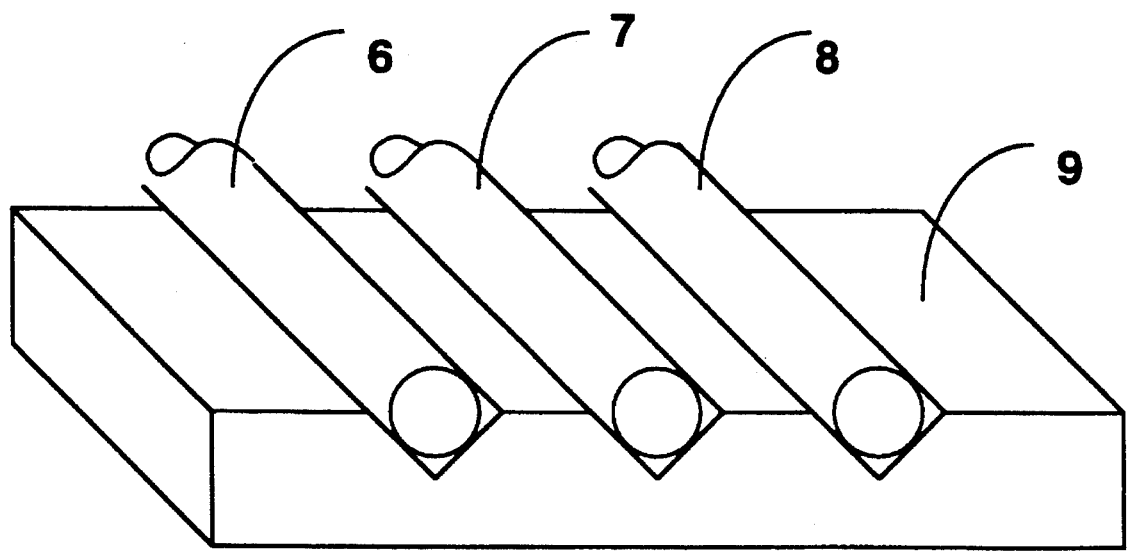
FIG. 3 shows schematically another conventional connector embodiment for aligning fibers using micromachined V-grooves.

As another conventional approach, FIG. 3 shows one part of connector with an array of optical fibers 6, 7, an 8 laid in V-grooves micromachined on a substrate 9, which is preferably a silicon wafer. A pair of such a part is brought together in an attempt to achieve fiber-to-fiber butt connection. Examples of this kind of prior art can be found in U.S. Pat. Nos. 5,315,678 (Maekawa, et.al.) and 4,725,114 (Murphy).

In these examples, we notice that the most critical element in aligning two optical fibers is positioning the ends of the fibers precisely on the mating plane. Thus, the problem is two-dimensional in its nature. However, the conventional optical connectors achieve the optical alignment via elongated elements such as plugs, sleeves, pins, and grooves, thus converting the optical interconnection problem from the two-dimensional nature to three-dimensional one. This is the origin of the difficulty experienced in the conventional interconnection approaches. In particular, the conventional interconnection approaches cannot benefit from the modern photolithographic technique that has sub micron registration accuracy, because the photolithography is largely a surface technology while the conventional connection means are three-dimensional in its nature.

Figure 4:
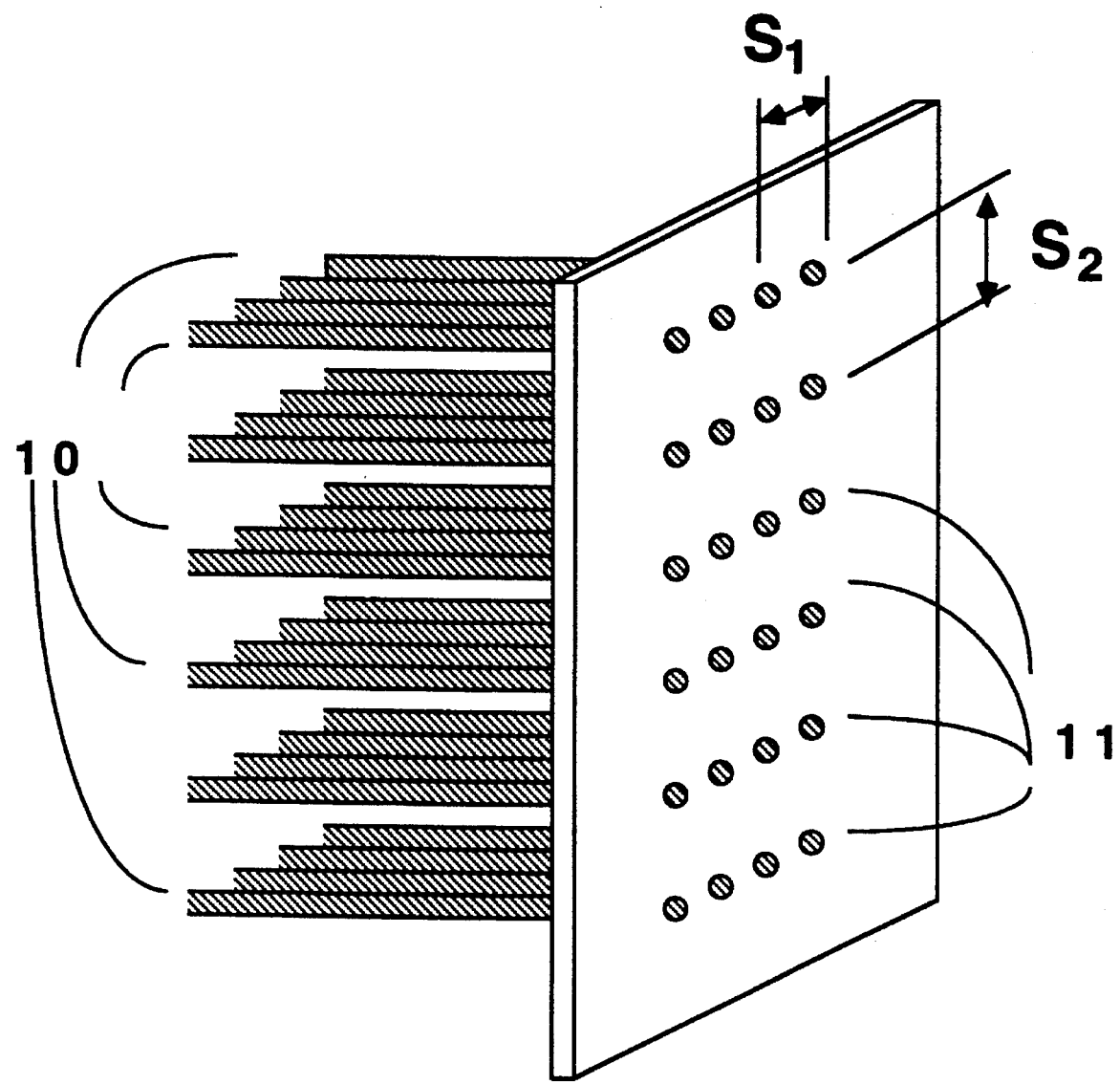
FIG. 4 shows schematically a novel embodiment of the present invention for an array of optical fibers.

In the present invention, an optical alignment is kept largely as a two-dimensional surface problem. More specifically, the alignment in the present invention mainly relies on the precise positioning of through holes on the mating surface of a thin slab. The positions of the holes are registered by the conventional precision photolithography that has sub-micron accuracy. Then the holes are etched through the thin slab utilizing various micromachining techniques such as chemical etching, ion-milling, sputter etching, etc. that are common in micro-electronics industries. In this approach, the depth of the holes is comparable to the hole clearance (i.e., the aspect ratio is around one). FIG. 4 shows schematically an embodiment of the present invention in which an array of optical fibers 10 are terminated on a thin slab provided with a group of shallow through-holes 11. The fibers 10 are in a perpendicular orientation with respect to the surface of the thin slab. The center-to-center distances $S_1$ and $S_2$ can be made precise within one micron.

Figure 5:
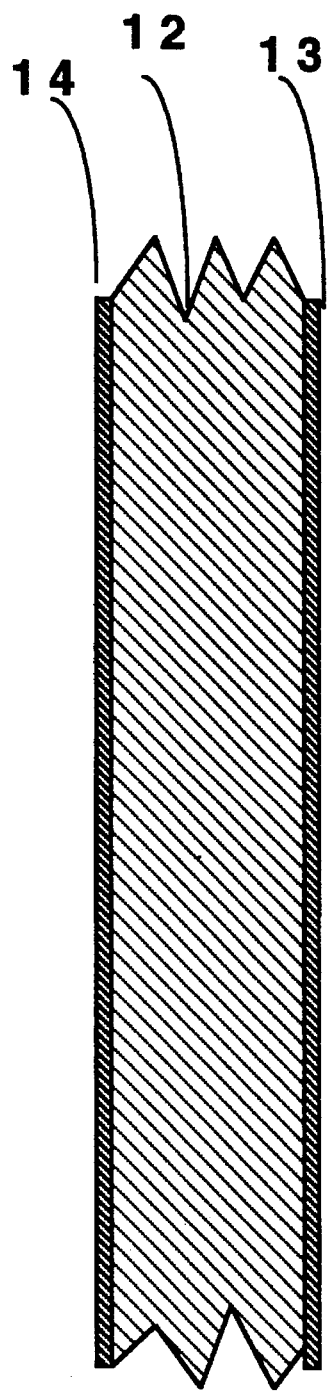
FIG. 5 shows a thin slab coated with mask layers on the surfaces.
Figure 6:
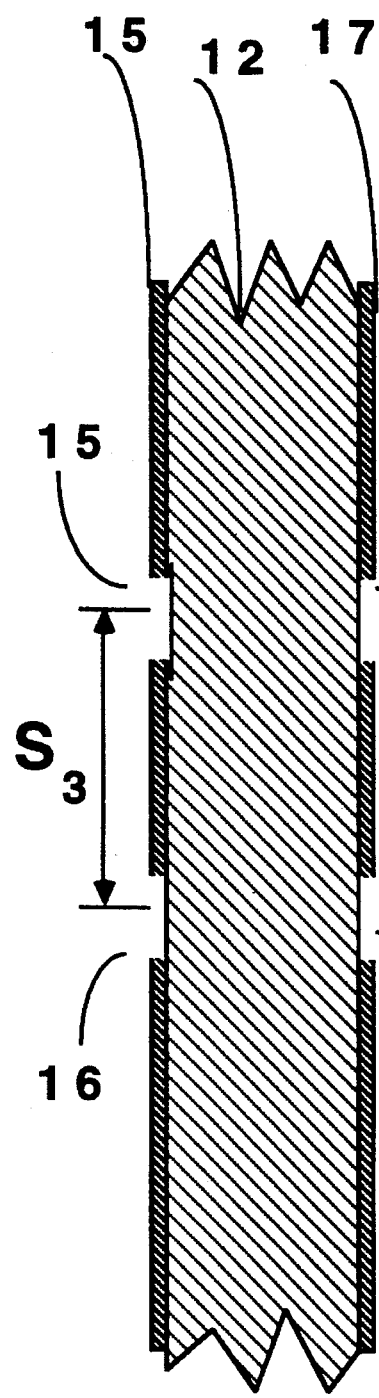
FIG. 6 shows the same as in FIG. 5, except that openings are made on the masks.
Figure 7:
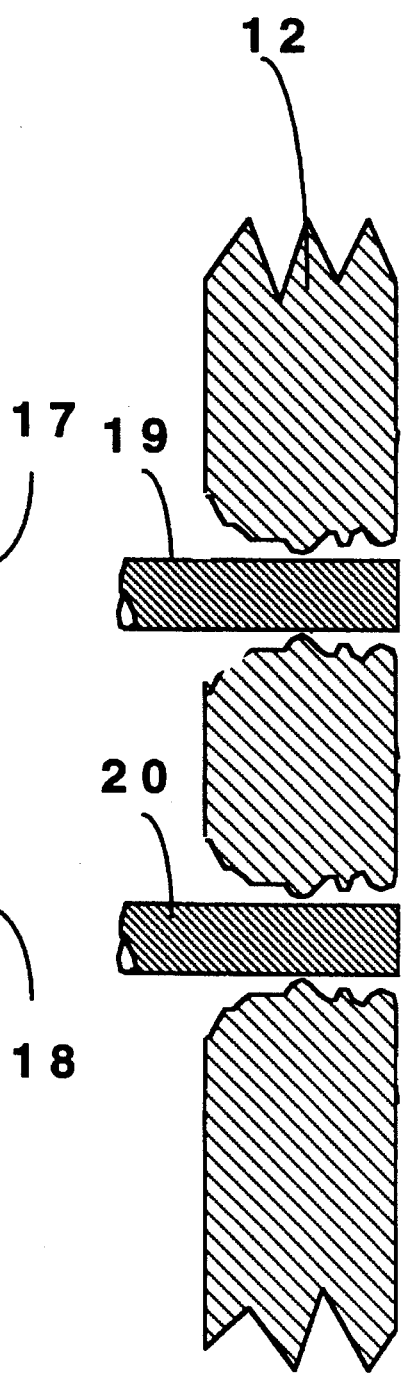
FIG. 7 shows the same as in FIG. 7, except that holes are created through the thin slab by a micromachining technique.

FIG. 5 through FIG. 7 illustrates a sequence of one micromachining procedure for fabricating the holes as shown in FIG. 4, through side views of a thin substrate or slab 12. First, as shown in FIG. 5, thin masking layers 13 and 14 are applied on the both sides of the slab 12. The layer will be typically about one micron thick. Then, as shown in FIG. 6 openings 15 and 16 are made on one side. Optionally, matched openings 17 and 18 may be made on the other side. Then, holes 19 and 20 are etched through the openings using a proper micromachining etch technique. FIG. 7 shows in a highly schematic manner the result of the etching. The mask layers 13 and 14 may be removed as indicated, or may remain as they are very thin. Depending on the technique used, the side walls of the holes 19 and 20 may be smooth or rough; also they may be straight or tapered in the diameter. In general, the slab thickness cannot be much larger than the hole diameter if one want to obtain a rather precise hole diameter. Actually the slab thickness should be about the same as, or smaller than, the hole diameter for a precision fabrication. Since most of the optical fibers have 125 μm cladding diameter, the hole size should be close to 125 μm. This makes slab thickness preferably about 100 to 200 μm thick.

Figure 9A:
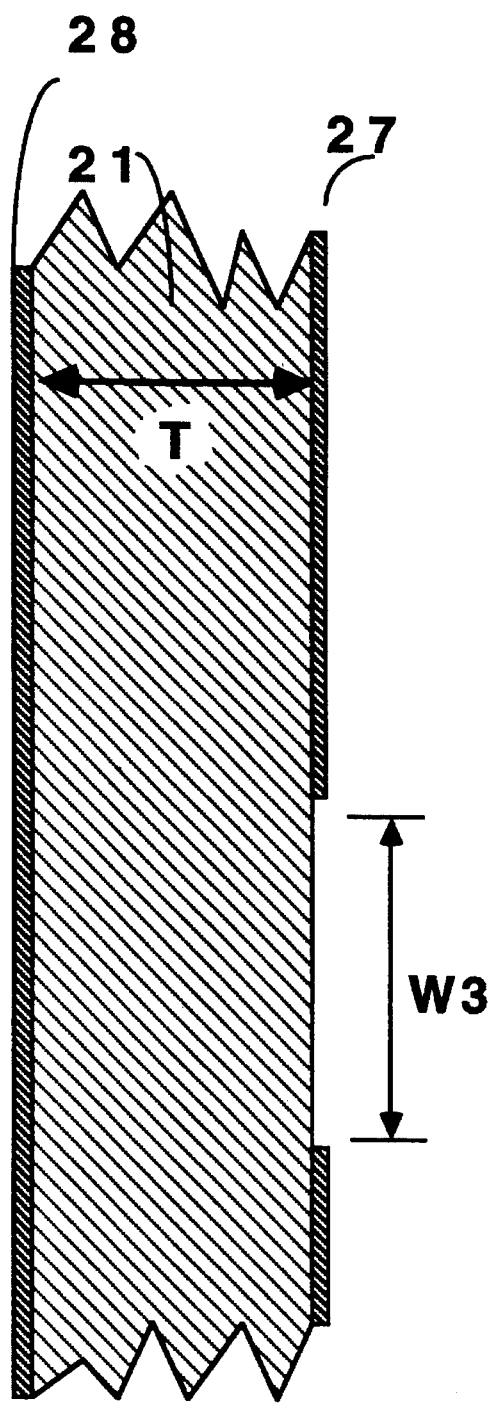
FIG. 9 shows a wafer with mask layers on the both sides, a side sectional view on the left (A) and a surface view on the right (B), in which the mask layer on the front side has an opening for etching.
Figure 9B:
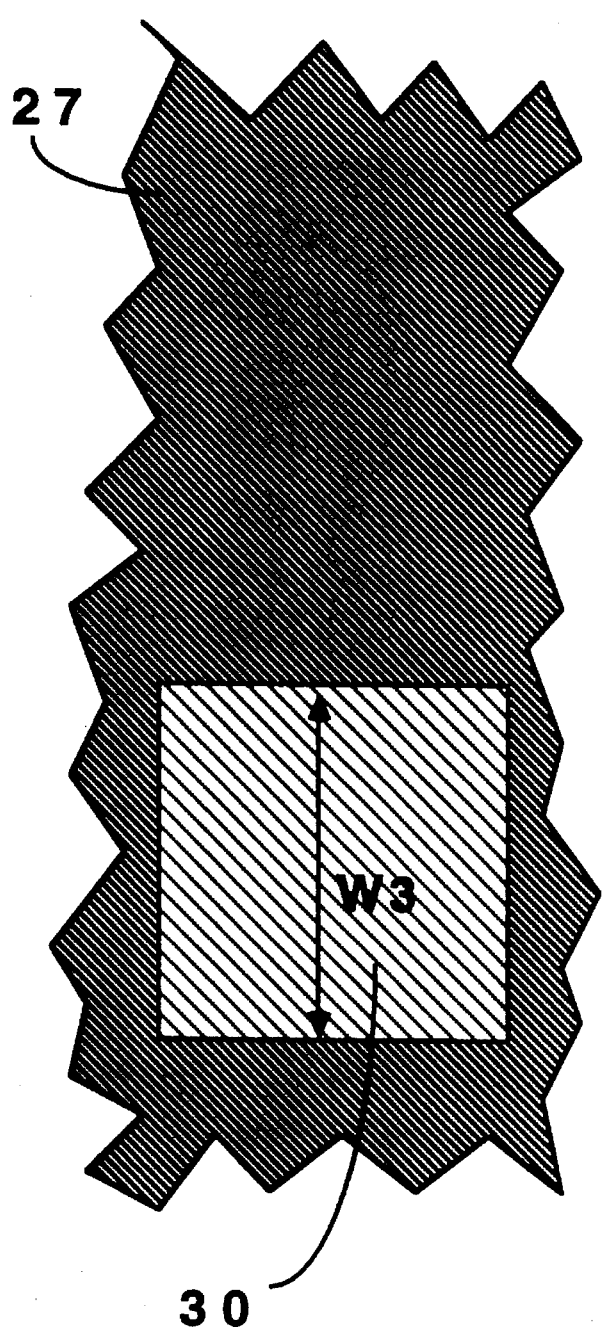

Now a preferred micromachining technique will be introduced through FIG. 8 through FIG. 28. This preferred micromachining technique is based on the well-known anisotropic preferential etching characteristics found in certain semiconductor wafers. For example, V-grooves and V-squares may be fabricated on a silicon wafer with (100) orientation. Actually the prior art introduced above related to FIG. 3, namely U.S. Pat. Nos. 5,315,678 (Maekawa, et. al.) and 4,725,114 (Murphy) teaches how to utilize such V-grooves for aligning optical fibers. In the present invention, we will teach how to utilize V-square through-holes for aligning optical fibers. The orientation of optical fibers are orthogonal between the prior arts and the present invention. FIG. 8 shows sectional side views of two wafers 21 and 22 with preferentially-etched through-holes 23 and 24;. As described below, one on the left (A) has been etched from the front side (fiber-mating side), and the other on the right side (B) from the rear side. The etching technique to produce such through-holes will be described in detail using FIG. 9 through FIG. 13. The fabrication is based on the well-known preferential etching of a silicon wafer with (100) orientation. The same or similar technique can be used on other crystal wafers such as gallium arsenide or indium phosphide. For example, on a (100) silicon wafer, V-squares can be fabricated in which the side walls have a definite angle with respect to the surface regardless of the square size. The detailed fabrication steps are as follows: as indicated in FIG. 9 (a sectional view on the left (A), and a surface view on the right (B)), a mask layer 27 is patterned on one side and another layer 28 on the other side (this second mask is to prevent etching of the back side) of a silicon wafer using photolithography technique. The technique has about one micron resolution in positioning a desired pattern on a pre-determined position. Then the wafer 21 is immersed in an etchant that etches the wafer in (100) direction much faster than in (111) direction (by a factor of about 500 to 1,000). Thus the etchant etches the silicon material mostly into the (100) direction, that is in the direction perpendicular to the wafer surface. The result of this so-called preferential etching is shown in FIG. 10 (a sectional view) and FIG. 11 (a surface view). The side-walls inside the V-square 23 shown in FIG. 10 are the hard-to-etch facets, namely the (111) facets. Accordingly, the depth of the V-groove depends solely on the width $W_3$ of the opening of the mask 27 as the orientation of (111) facet is constant for a material (such as silicon). The mask layer 28 is stripped off when the etching is completed. This completes the fabrication of the through-hole 23.

Again, the angle of the side walls is universal and constant for the wafer as it is defined by the (111) facets of the silicon. Accordingly, if the size of the hole $W_2$ and the wafer thickness T are known, the value for the mask opening $W_3$ can be calculated precisely.

When the optical fiber is entering from the left side of the through-hole as in FIG. 8, it would be convenient to have the through-hole tapered out toward the left side of the wafer, as shown in FIG. 12. This can be realized by providing an opening on the mask layer 29 on the left-side as shown, and etch through the opening 29. The mask layer 30 in FIG. 12 may be made of a transparent thin-film dielectric material such as glass or silicon nitride so that it does not have to be removed. It may work as a window for optical fiber that is inserted into the through-hole 24. FIG. 13 shows a straightforward extension of the embodiment and the technique described in FIG. 9 through 12 to an array form, in which two through-holes 31 and 32 are prepared in the same manner, and two optical fibers 33 and 34 are terminated as indicated. The center-to-center distance S4 between the through-holes 31 and 32 may be made precise with better than one-micron accuracy.

FIG. 14 shows a slight variation in which the mask layers 35 and 36 have openings. When the wafer 37 is etched, a twin V-square through-hole 38 is produced as shown in FIG. 15. As will be shown later in FIG. 18, this embodiment will work as a connector sleeve 49.

Figure 16:
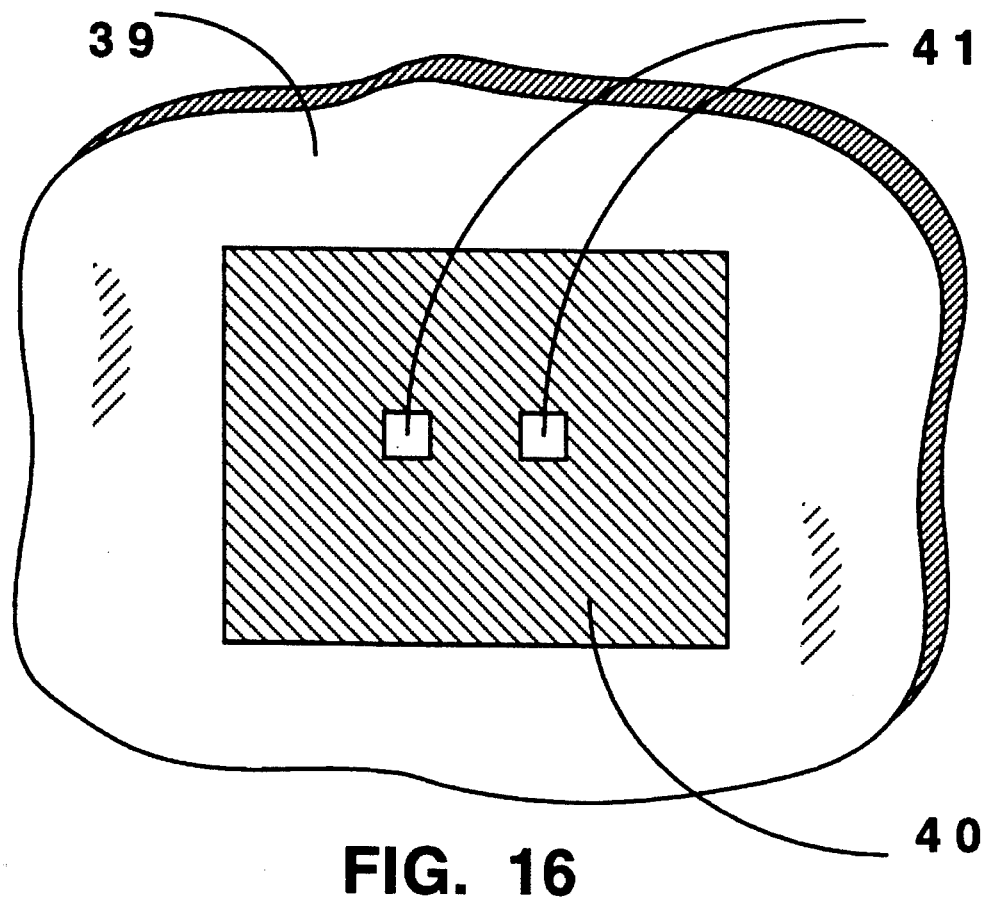
FIG. 16 shows a wafer with a large-size square mask, and small-size square masks inside the large-size square mask.

Now, we will describe a method to prepare the edge of the connector plug such as shown in FIG. 4. FIG. 16 shows a wafer 39 that has a large square mask 40, and an array of small square openings 41 for making holes for fibers (11 in FIG. 4). Preferential etching will then result in a connector plug 42 with the V-sloped edges 43, 44, 45, and 46. When the smaller square openings 41 are on the front side of the wafer 39, the resulting hole-fiber orientation will be like the one shown in FIG. 8(A); and when the smaller square openings 41 are on the rear side, it will be like the one shown in FIG. 8(B). Thus, the small squares 41 are preferably located on the rear side of the wafer 39 so as to produce V-squares with more convenient orientation for fiber insertion.

Figure 17:
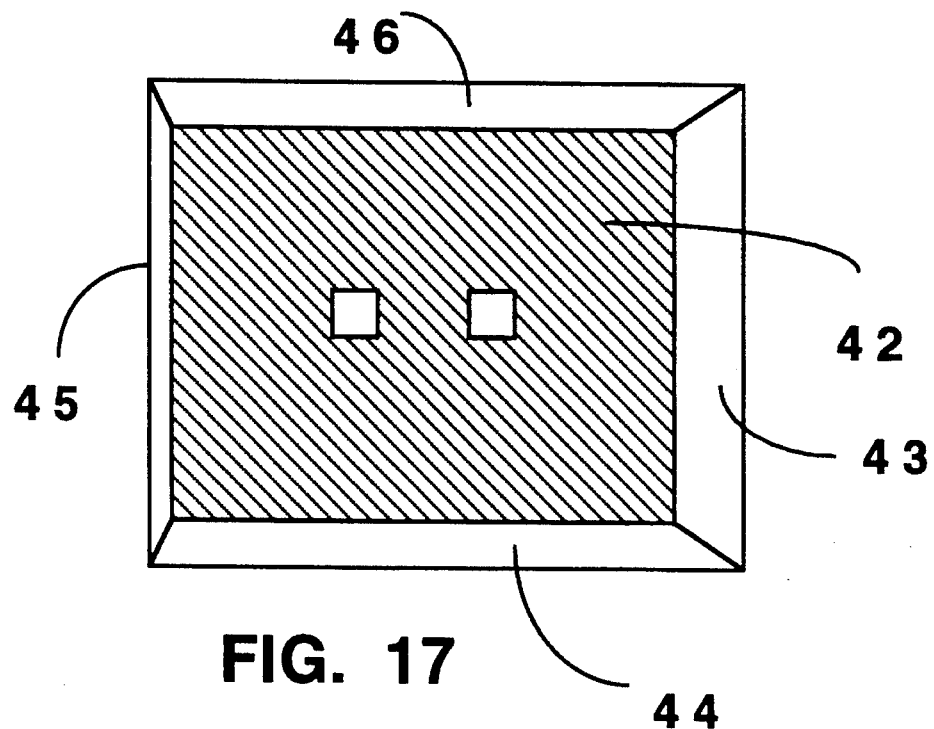
FIG. 17 shows the embodiment of FIG. 16 having been preferentially etched so as to produce a connector plug.

The number of holes in FIG. 17 can range from one to more than a few hundreds. Making one hole takes as much etching time as making one thousand. Since the distance between two neighboring holes may be closer than 0.5 mm, one can accommodate more than 10,000 holes and 10,000 fibers on a 3" silicon wafer.

Figure 18:
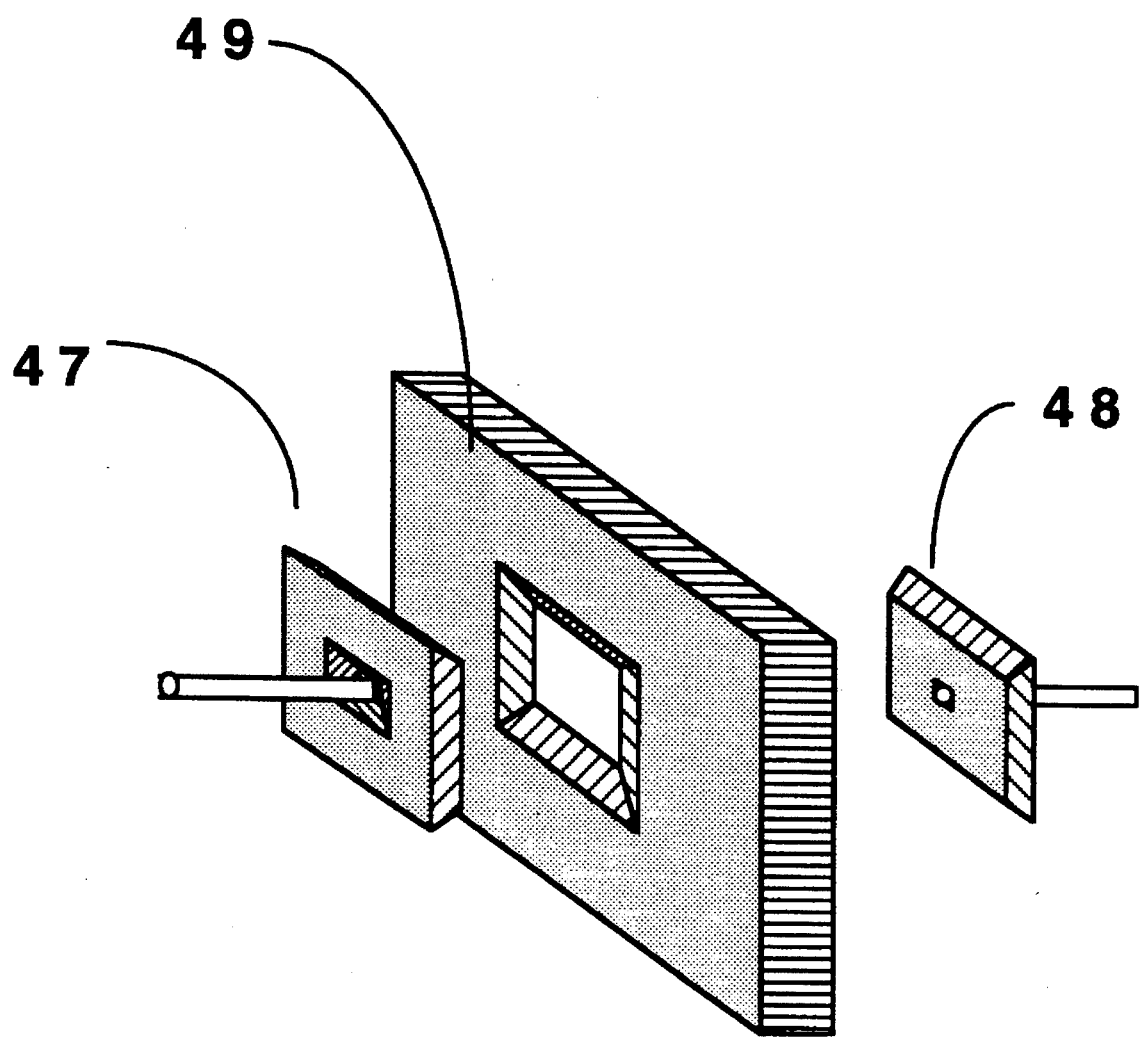
FIG. 18 shows two connector plugs made by the method illustrated in FIGS. 16 and 17, and a connector sleeve made by the method illustrated in FIGS. 14 and 15.

FIG. 18 shows two plugs 47 and 48 fabricated following the procedure described in FIGS. 16 and 17, for a case of one hole. FIG. 18 also shows a sleeve 49 fabricated following the procedure described in FIGS. 14 and 15. Since the side-walls have the same slope angle and the dimensions are registered precisely, the plugs 47 and 48 will seat in the sleeve 49 with a precise alignment.

Figure 19:
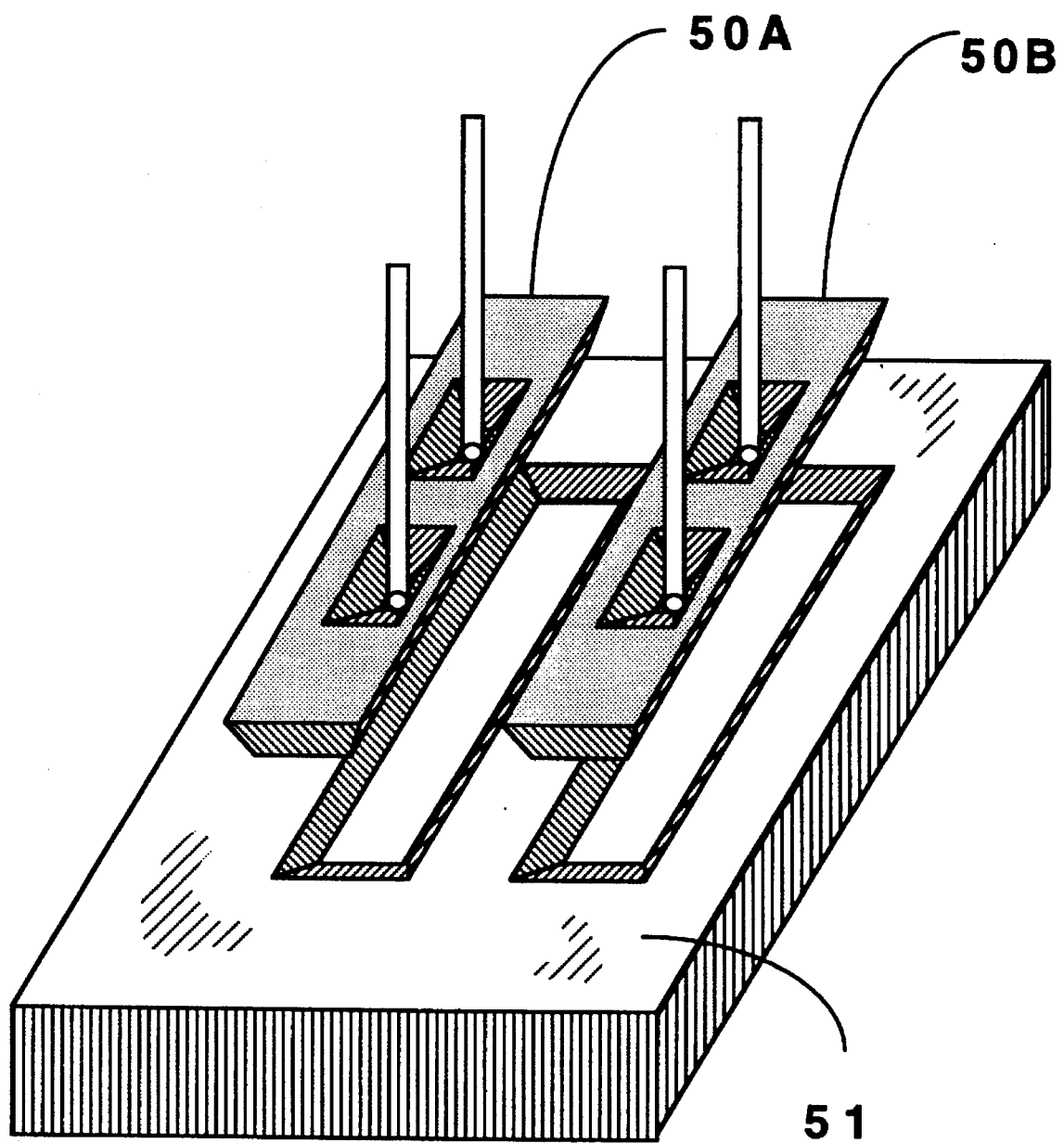
FIG. 19 shows an extension of the embodiments of FIG. 18 into a combined array form; an array for the fibers and an array for the plugs.

FIG. 19 shows an simple extension of FIG. 18 to a combined array form; an array for the holes and fibers, and an array for the plugs 50A and 50B.

Figure 20:
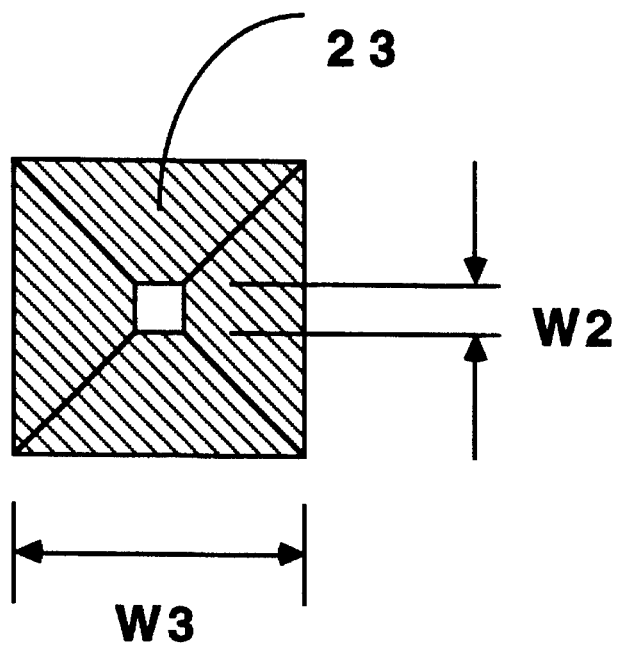
FIG. 20 repeats the hole shown in FIG. 11.
Figure 21:
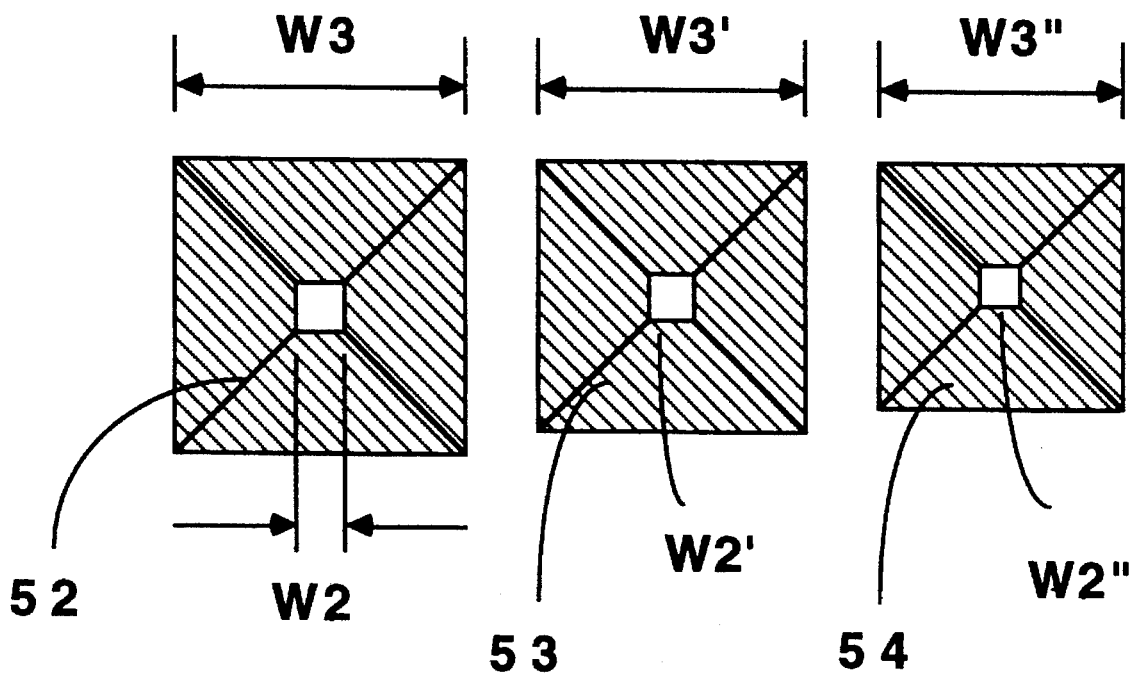
FIG. 21 shows a number of holes with slightly varying clearances.

FIG. 20 repeats the square-hole drawing of FIG. 11. When the through-hole 23 is fabricated, the hole clearance $W_2$ has to be very close to the diameter of the optical fiber in order to achieve precision fiber alignment. For a given value $W_3$, the resulting value for $W_2$ could vary slightly since, referring to FIGS. 10 and 11, there would be a slight variation in the thickness T of wafer 21, and also some undercut of the masked edges by the etchant. As a result, the hole clearance $W_2$ could turn out to be anywhere between 124 and 130 microns while the optical fiber diameter itself can vary between 123 to 127 microns. In the worst case the hole size $W_2$ could be larger than an optical fiber by seven microns, or the hole size $W_2$ could be smaller than the fiber diameter. In order to compensate these variations in the hole size and the fiber diameter, a number of through-holes with varying dimensions can be fabricated, as depicted in FIG. 21, which shows three through-holes 52, 53, and 54, which have three different sizes of mask openings W3, W3', and W3", and three corresponding sizes of the through-holes W2, W2' and W2" (as examples, these three values could be 127, 125 and 123 microns, respectively) One of these three through-holes would match to a given optical fiber better than the other holes. The number of holes may be more than three. The resulting embodiment is shown in FIG. 22, which is a variation of the surface layout shown in FIG. 4: each of the through-holes in FIG. 4 is replaced by three through-holes in FIG. 22.

Figure 22:
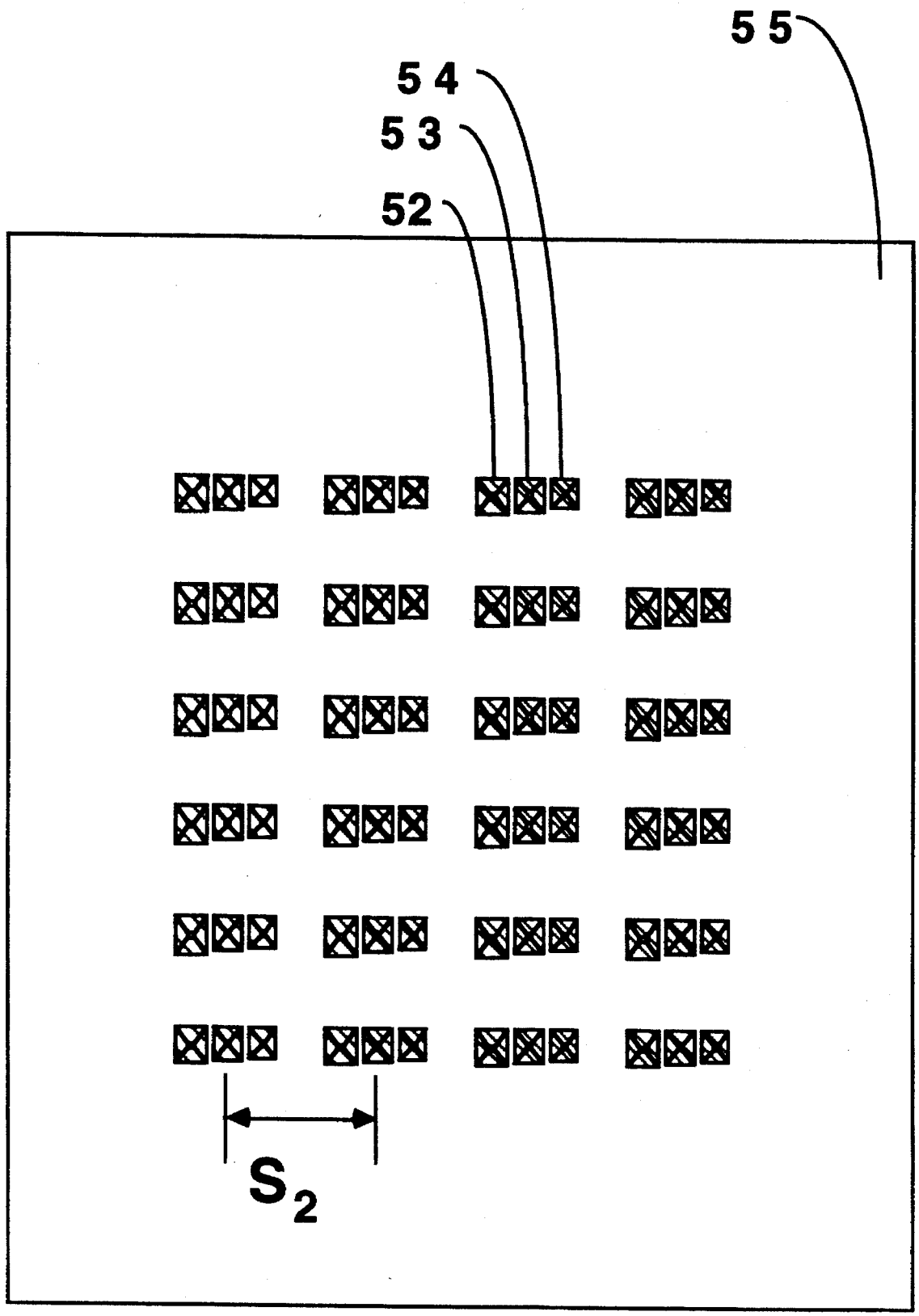
FIG. 22 shows the same array of the through-holes as shown in FIG.4, except that each hole of FIG. 4 has been replaced by a set of through-holes of FIG. 21.

The fiber array connector plug as shown in FIGS. 4 or 22 may be mated not only with an identical connector plug as shown in FIG. 18, but also with an array of laser diodes, detectors, LED's, and other optical components. These components can be made in an array form that matches with the array of the plug. Extensive teaching on this application is described in the parent patent application referred at the outset, namely, Ser. No. 08/276,829, filing date 07/1894, titled "FACE-LOCK INTERCONNECTION MEANS FOR OPTICAL FIBERS AND OTHER OPTICAL COMPONENTS, AND MANUFACTURING METHODS OF THE SAME".

Figure 23:
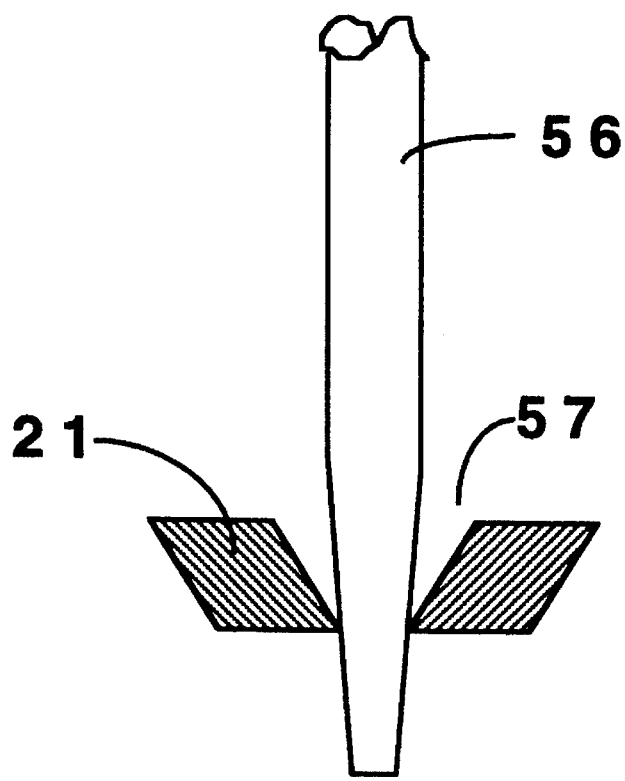
FIG. 23 shows basically the same as in FIG. 8, except that the optical fiber is tapered along the length, and the hole clearance is made slightly smaller, so that the fiber is tightly fit at a certain location along the tapered length.
Figure 24:
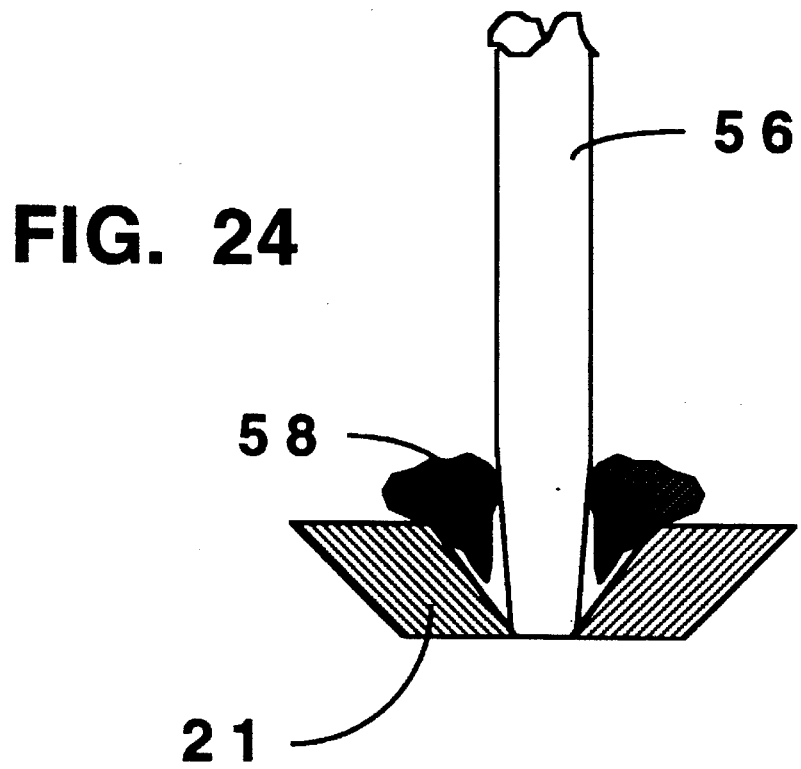
FIG. 24 shows the same as in FIG. 23, except that the fiber has been cut and polished to complete the termination.

Another approach to improve the fiber fitting in a hole is shown in FIG. 23, in which an optical fiber is tapered in its diameter along the length so that it fits tightly in the hole 57 at a certain position. After filling the hole 57 with a cementing material 58, the fiber 56 may be prepared as shown in FIG. 24 by breaking off the tip and polishing the end.

Figure 25:
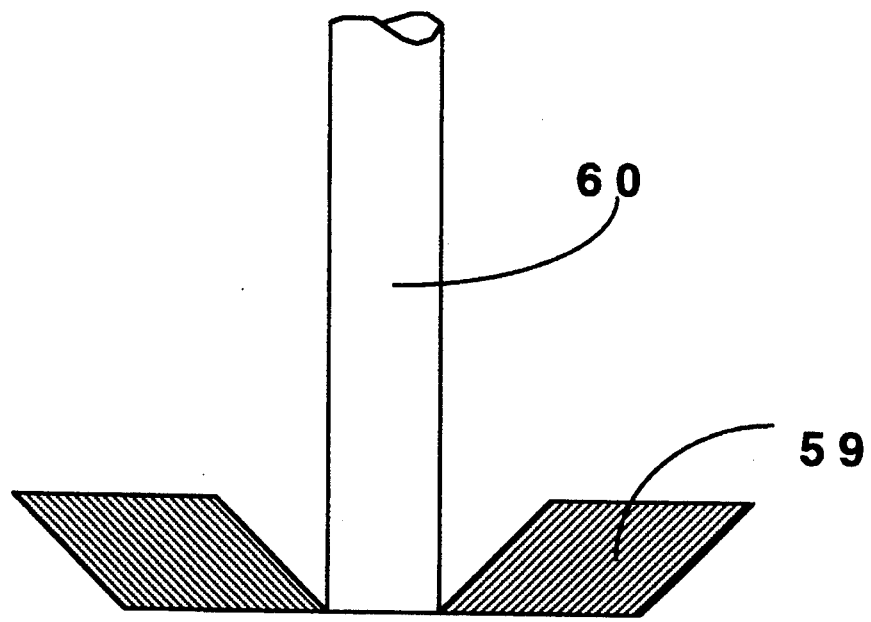
FIG. 25 repeats the plug shown in FIG. 8.
Figure 26:
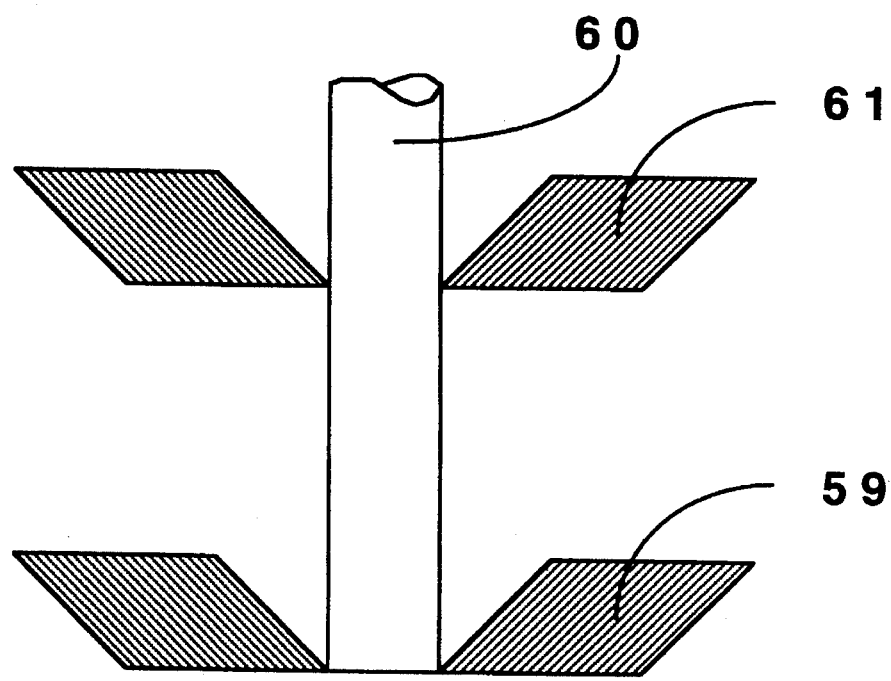
FIG. 26 shows the same as in FIG. 25, except that one more slab with a hole is provided to stabilize the orientation of the optical fiber.
Figure 27:
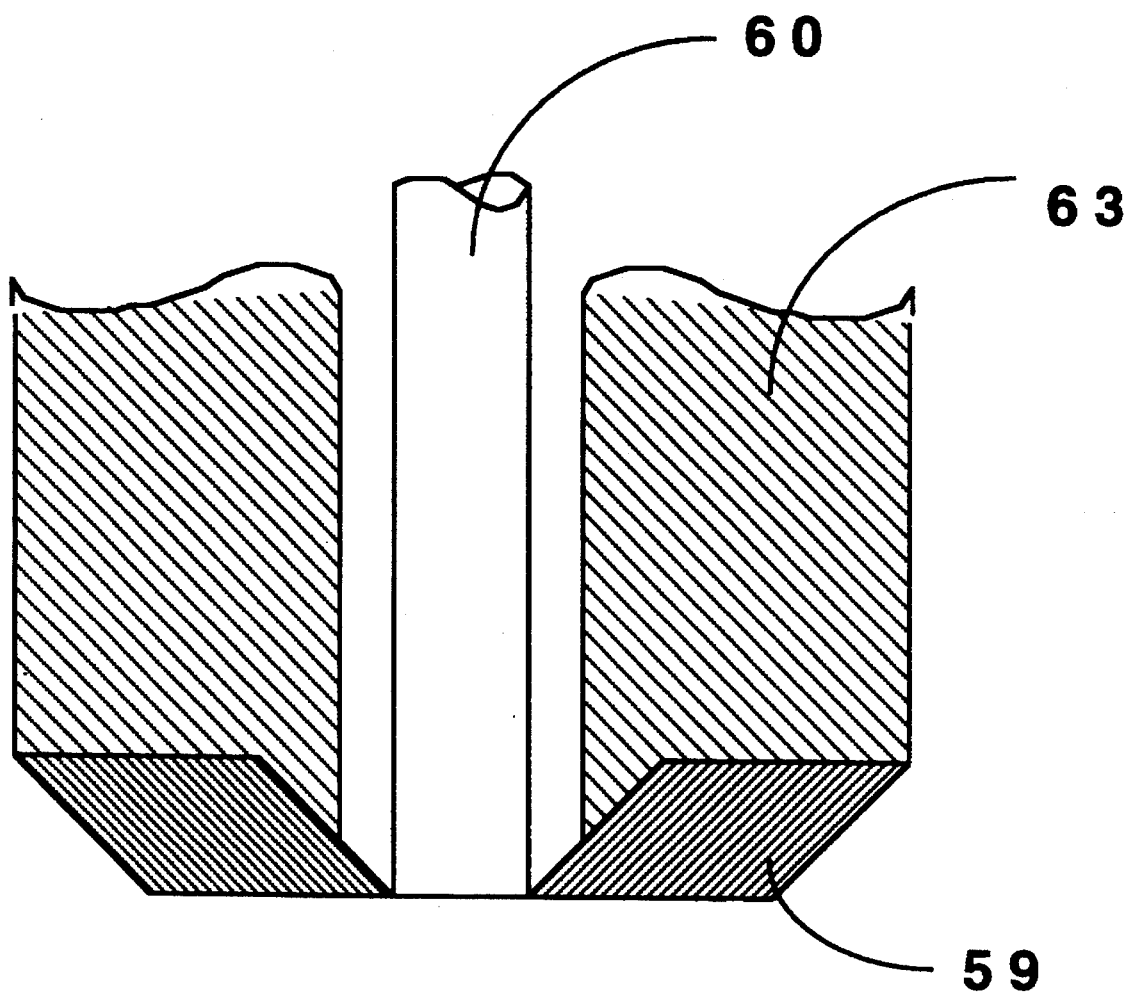
FIG. 27 shows that a supporting bulk with an over-sized through-hole is attached behind the micromachined plug of FIG. 25.
Figure 28:
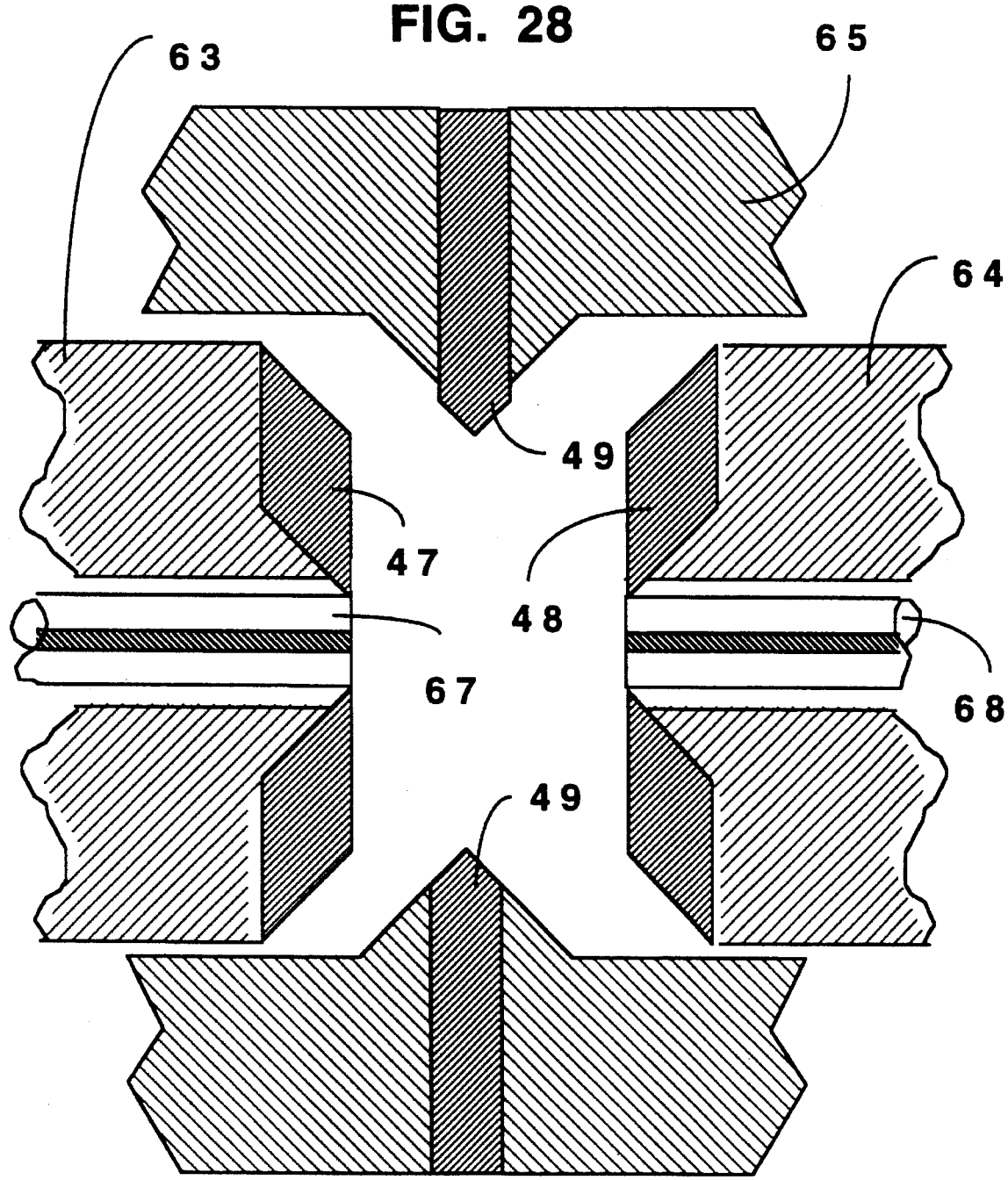
FIG. 28 shows the same as in FIG. 18, except that a bulk with an over-sized through-hole is attached behind each of the micromachined plugs and the sleeve.
Figure 29:
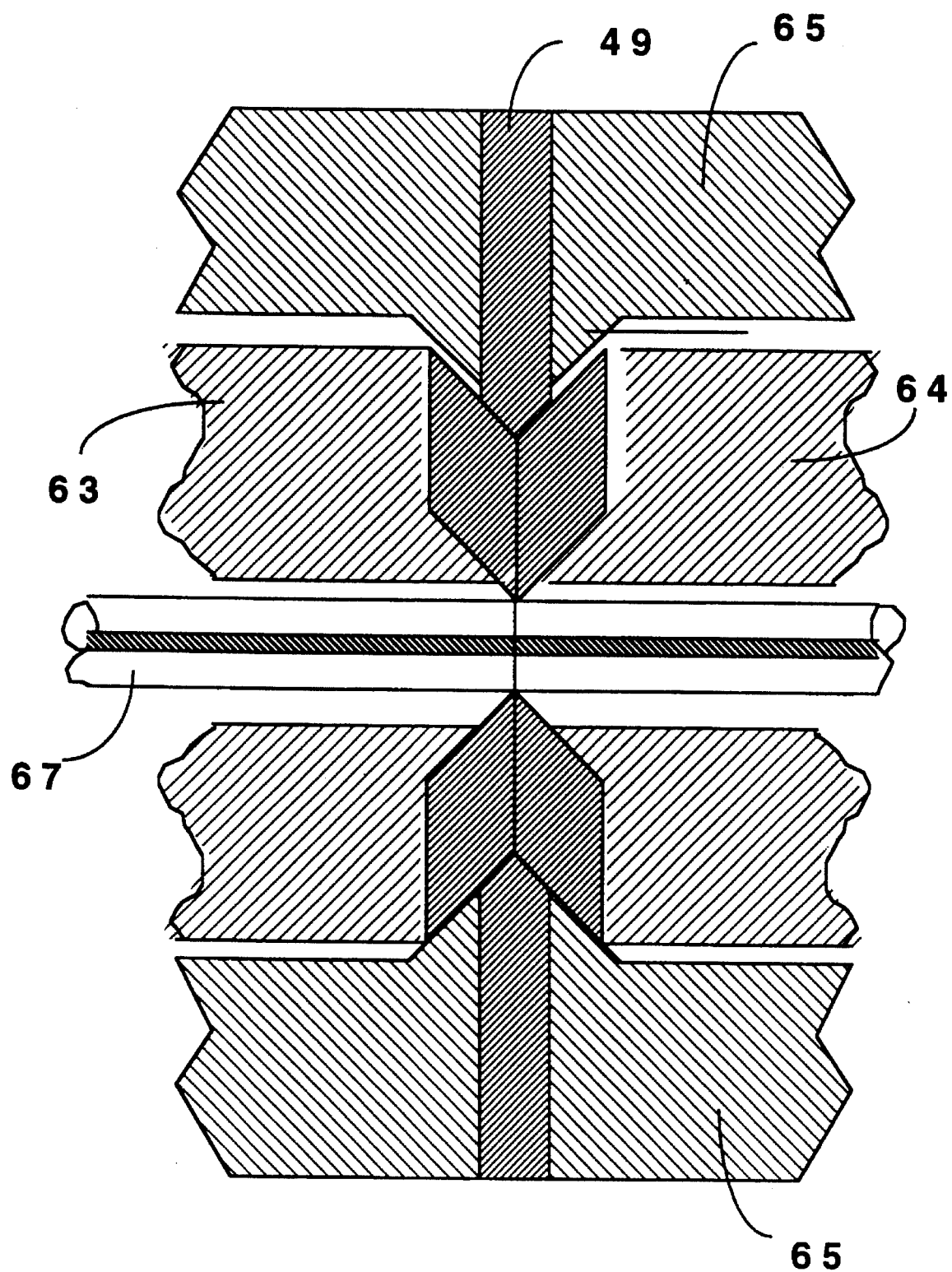
FIG. 29 shows the same as in FIG. 28 after the mating is completed.

In describing the novel embodiments above, we have been illustrating only thin slabs and optical fibers, as in FIG. 25, without describing any support means to hold the fiber in the desired orientation. This was to clarify the novel features of the embodiments. There are many ways of stabilizing the optical fiber 60 in FIG. 25. One way is shown in FIG. 26 in which one more identical plug 61 joins the alignment plug to anchor the fiber 60. Another approach is shown in FIG. 27 in which a bulk body 63 is supporting the thin-slab plug 59 on the rear side. The bore and the position of the supporting body 63 do not have to be precise since the thin-slab plug 59 performs the alignment function. Actually it would be necessary that the bore size of the supporting bulk 63 is somewhat oversized to make fiber-plug easier. FIG. 28 shows the sectional view of the configuration of FIG. 18, with supporting bulks explicitly shown. FIG. 29 shows the same with the mating plugs 47 and 48 fully engaged. In order to assure precise axial alignment of the mating optical fibers 67 and 68 in FIG. 29, it would be helpful to make the clearance of the sleeve 49 slightly smaller so that a gap exists between the plugs 47 and 48 in full engagement. This is because, in general, the center of a micromachined V-squares remains invariant even when the hole size varies due to the slight variation of the thickness of wafers ("T" in FIG. 10) and undercutting of edges during preferential etching. This "invariance of the center" is the powerful ally of the novel embodiments described in the present patent application in achieving the precision alignment.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical fiber connector plug comprising an optical fiber; and a substantially planar thin slab provided with a front surface, a rear surface, and a through-hole; wherein the through-hole is registered and fabricated with the aid of the lithography so as to ensure precise location of the through-hole, and the bore size of the through-hole is slightly larger than the diameter of the optical fiber, the optical fiber is terminated on the front surface of the thin slab, and the optical fiber is oriented substantially perpendicular to the front surface of the slab.

2. The invention according to claim 1 wherein the through-hole is created by etching the thin slab by a micromachining technique.

3. The invention according to claim 2 wherein the micromachining technique consists of wet chemical etching.

4. The invention according to claim 2 wherein the micromachining technique consists of a dry-etching.

5. The invention according to claim 4 wherein the dry etching technique consists of ion-milling.

6. The invention according to claim 4 wherein the dry etching technique consists of sputter-etching.

7. The invention according to claim 1 wherein the thin-slab is made of a material with preferential etching characteristics so as to permit fabrication of a precise through-hole.

8. The invention according to claim 7 wherein the material is silicon.

9. The invention according to claim 8 wherein the silicon has (100) orientation so as to allow fabrication of a V-square through-hole with well-defined side walls sloped at a specific angle with respect to the surface of the thin slab.

10. The invention according to claim 7 wherein the material is gallium arsenide.

11. The invention according to claim 7 wherein the material is indium phosphite.

12. The invention according to claim 7 wherein the through-hole is etched from the rear side of the thin slab so as to make the bore size of the through-hole larger on the rear side than on the front side.

13. The invention according to claim 7 wherein the outside boundaries of the slab are formed by the preferential etching so that the slab is substantially rectangular in shape, and the side lengths are precise, and the side edges have sloped surfaces with the slope angle same as the slope angle of the inside walls of the through-hole.

14. An optical fiber connector sleeve comprising a substantially planar thin slab with a front surface, rear surface and a through-hole; wherein the through-hole is registered and fabricated by lithographic method to ensure precise size and location, and the bore size of the through-hole is larger on the front surface and the rear surface as compared to the bore size in the mid-point between the two surfaces so that connector plugs may be seated on the front and the rear surfaces of the thin slab for optical fiber alignment.

15. The invention according to claim 14 the thin-slab is made of a material with preferential etching characteristics so as to permit fabrication of precise through-hole.

16. The invention according to claim 15 wherein the material is silicon.

17. The invention according to claim 16 wherein the thin slab made of silicon has (100) orientation so as to allow fabrication of a V-square through-hole with well-defined side walls sloped at a specific angle with respect to the surface of the thin slab.

18. The invention according to claim 15 wherein the material is gallium arsenide.

19. The invention according to claim 15 wherein the material is indium phosphite.

20. An optical fiber connector plug comprising a plurality of optical fibers; and a substantially planar thin slab with a front surface, rear surface and a plurality of through-holes; wherein the through-holes are registered and fabricated with the aid of the lithography so as to ensure precise locations of the through-holes and precise intervals among the through-holes, and the bore sizes of the through-holes are slightly larger than the diameter of the optical fibers, one of the optical fibers is inserted into one of the through-holes from the rear side so as to terminate the end of the optical fiber on the front surface of the thin slab, and the optical fibers are oriented substantially perpendicular to the front surface of the slab.

21. An optical fiber connector sleeve comprising a substantially planar thin slab with a front surface, rear surface and a plurality of through-holes; wherein the through-holes are registered and fabricated with the aid of the lithography so as to ensure precise locations of the throughholes and precise intervals among the through-holes, and the bore sizes of the through-holes are larger on the front surface and the rear surface as compared to the bore sizes in the mid-point between the two surfaces so that connector plugs may be seated on the front and the rear surfaces of the thin slab for optical fiber alignment.

* * * * *